UNITED STATES PATENT OFFICE.

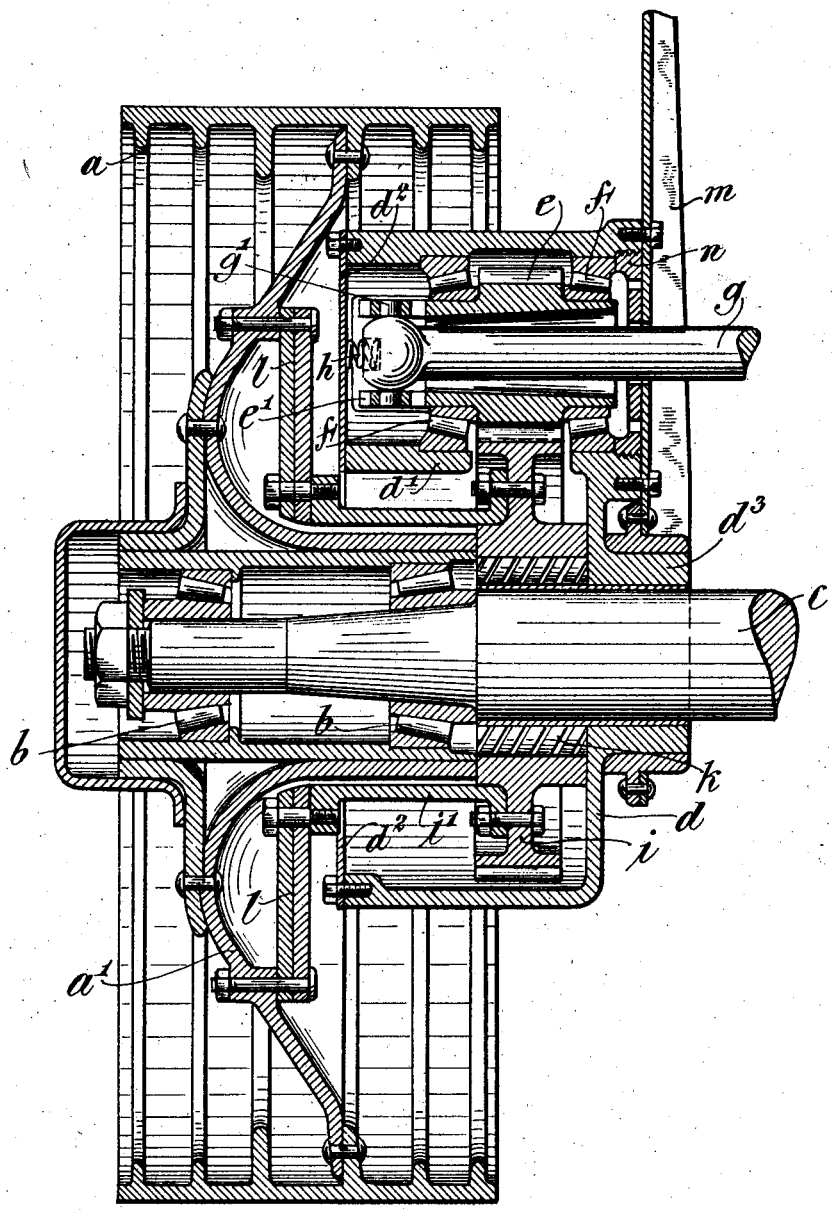

ALFRED F. MASURY, OF NEW YORK, N. Y., ASSIGNOR TO INTERNATIONAL MOTOR COMPANY, OF NEW YORK, N. Y., A CORPORATION OF DELAWARE.

DRIVE FOR MOTOR-VEHICLES.

1,392,517.  Specification of Letters Patent.  Patented Oct. 4, 1921.

Application filed April 15, 1919. Serial No. 290,120.

*To all whom it may concern:*

Be it known that I, ALFRED F. MASURY, a citizen of the United States, residing in the borough of Manhattan of the city of New York, in the State of New York, have invented certain new and useful Improvements in Drives for Motor-Vehicles, of which the following is a specification, reference being had to the accompanying drawing, forming a part hereof.

This invention relates to an improved wheel drive for motor vehicles in which the propelling force is applied directly to the wheel through suitable gears associated therewith rather than through live axle sections. The object of the invention is to improve devices of this character by supporting the drive gearing on the axle independent of the wheel so that the gearing is relieved of the road shocks which are impressed on the wheel and which have a tendency to throw its bearings out of alinement. The features of construction will be pointed out more clearly hereinafter in connection with the description of the illustrated embodiment shown in the drawing, the drawing illustrating in section so much of a vehicle wheel and the driving mechanism therefor as is necessary for an understanding of the improvements.

The wheel hub $a$ is mounted by roller bearings $b$ on the dead axle $c$. Independent of the supporting bearings for the wheel is a housing $d$ which is also mounted on the axle $c$ and is formed with a casing $d'$ in which is carried a driving pinion $e$ on roller bearings $f$. The end of the casing $d$ may be inclosed by a dust cap $d^2$. Extending into the casing $d'$ and through the hub of the pinion $e$ is a drive shaft $g$ the end of which is engaged with the hub of the pinion $e$ by a universal connection represented by studs $g'$ resting in slots $e'$ at the end of the hub. Interposed between the end of the shaft $g$ and the dust cap $d^2$ is a spring $h$ to hold the shaft yieldingly against axial movement and jars. Within the housing $d$ is disposed a spur gear $i$ which is mounted rotatively on the axle $c$ by means of suitable bearings $k$. This spur gear is in mesh with the driving pinion $e$. The rotative movement of the spur gear $i$ is transmitted to the hub $a$ positively through a suitable flexible connection indicated as a thermoid coupling $l$. This coupling may be secured to an annular flange $i'$ bolted on the face of the gear $i$ and to the web $a'$ of the hub. The torque reaction impressed on the casing $d$ from the driving pinion is opposed by a torque arm $m$ bolted to the casing and connected to some suitable portion of the vehicle. This torque arm may be supported on the hub $d^3$ of the casing $d$. In assembling and disassembling the driving pinion $e$ access is had to the interior of the housing $d'$ through an opening in the end wall thereof which may be closed by a removable screw plug $n$.

By the construction described it will be evident that the driving mechanism consisting of the pinion $e$ and spur gear $i$ and the casing in which they are mounted, is supported on the axle $c$ by bearings which are entirely independent of the wheel bearings on the axle. Further, it is to be noted that the connection between the driving mechanism and the wheel while positive is a flexible one so that the movement of the wheel occasioned by road shocks is not transmitted to the gearing and consequently wear or disalinement of the bearing of the wheel cannot affect its driving mechanism. Movement of the axle, of course, causes corresponding movement of the entire driving mechanism with it but the flexible connection between the drive shaft $g$ and the driving pinion $e$ prevents any liability to injury of these associated parts.

While the construction herein illustrated has many advantages in accessibility and permits the ready assembling or disassembling of the elements, it is to be understood that the improved manner of the mounting and driving mechanism independent of the wheel may be practised in other ways without departing from the spirit of the invention, the scope of which is defined in the appended claims.

I claim as my invention:

1. In combination with the wheel and dead axle of a motor vehicle, driving mechanism for the wheel comprising a spur gear mounted rotatively on the axle independent of the wheel, a driving pinion in mesh with the gear, a casing inclosing the spur gear and mounted non-revolubly on the axle independent of the wheel, a housing formed in the casing to support the driving pinion, and a positive but flexible connection between the pinion and the wheel.

2. In combination with the wheel and dead axle of a motor vehicle, driving mechanism for the wheel comprising a spur gear, a flexible connection between the spur gear and the wheel, a driving shaft outside of the axle, a pinion on the driving shaft provided with a slotted hub, studs carried on the shaft and disposed within the slots to form a universal coupling between the shaft and the pinion, and a spring engaging the end of the shaft to hold it yieldingly against axial movement.

This specification signed this 5th day of April, A. D. 1919.

ALFRED F. MASURY.